United States Patent [19]

Lucas

[11] Patent Number: 4,599,394
[45] Date of Patent: Jul. 8, 1986

[54] PROCESS FOR PRODUCING ALKOXY-TERMINATED POLYSILOXANES

[75] Inventor: Gary M. Lucas, Scotia, N.Y.

[73] Assignee: General Electric Company, Waterford, N.Y.

[21] Appl. No.: 770,537

[22] Filed: Aug. 28, 1985

Related U.S. Application Data

[62] Division of Ser. No. 446,233, Dec. 2, 1982.

[51] Int. Cl.⁴ .............................................. C08G 77/06
[52] U.S. Cl. ...................................... 528/15; 528/31; 528/32; 525/478
[58] Field of Search ............................ 528/15, 31, 32; 525/478

[56] References Cited

U.S. PATENT DOCUMENTS 2,823,218  2/1958  Speier et al. .......................... 525/478
4,176,093 11/1979  Zoch ..................................... 524/404
4,510,094  4/1985  Drahnak ............................... 556/470

*Primary Examiner*—Melvyn I. Marquis
*Attorney, Agent, or Firm*—Gary L. Loser

[57] ABSTRACT

The present invention relates to a alkoxy-functional one-component RTV composition. In particular, there is disclosed processes for producing an alkoxy-terminated diorganopolysiloxane by reacting a vinyl or silanol containing siloxane with an alkoxy-functional hydride containing silane in the presence of a platinum catalyst.

4 Claims, No Drawings

PROCESS FOR PRODUCING ALKOXY-TERMINATED POLYSILOXANES

This application is a division of application Ser. No. 446,233, filed Dec. 2, 1982.

BACKGROUND OF THE INVENTION

The present invention relates to one-component alkoxy-functional RTV compositions and more particularly, the present invention relates to a process for the preparation of alkoxy-terminated diorganopolysiloxane polymers which can be utilized to form one-component RTV silicone rubber compositions.

One-component room temperature vulcanizable (room temperature vulcanizable shall herein after be referred to as RTV) silicone rubber compositions are well-known. These compositions can vary depending on the functionality of the cross-linking agent; for instance, alkoxy-functional RTV silicone rubber compositions are disclosed in Beers, U.S. Pat. No. 4,100,129. These compositions comprise, basically, a silanol terminated diorganopolysiloxane polymer, an alkoxy-functional cross-linking agent such as methyltrimethoxysilane and a titanium chelate condensation catalyst. Such alkoxy-functional RTV compositions have the advantage that they are non-corrosive and that they do not give off pungent and irritating odors during cure. There are other one-component RTV systems with different functionalities such as, for instance, amine-functionality. However, for many applications it is desirable that the systems exhibit fast cure and have non-corrosive properties. Other compositions which do have fast cure and non-corrosive properties are, for instance, amino functional systems as disclosed in Nitzsche, et al, U.S. Pat. No. 3,032,528 and enoxy-functional systems as disclosed in Tekago, U.S. Pat. No. 3,819,563 and Tekago, U.S. Pat. No. 4,180,642 in which acetone is evolved during the curing of the system. The disadvantage of the amino-functional system is that it gives off obnoxious fumes while curing, and frequently toxic cure by-products. Further, the enoxy-functional RTV system while having the advantageous properties of being fast-curing and non-corrosive, nevertheless, is quite expensive to manufacture. Accordingly, it is desirable to have a fast-curing, non-corrosive and as inexpensive as possible one-component RTV system for many applications in which silicone RTV compositions are utilized.

In this respect the alkoxy-functional system of Beers, U.S. Pat. No. 4,100,129 has some of these properties. However, these compositions have the disadvantage that they are not as fast curing as would be desired. Further, the cure of these compositions is retarded during storage, so that even after a period of storage after manufacture of as short as 2 weeks, the cure properties are affected. Thus, even though these compositions can be produced to have a storage life anhydrously or semi-anhydrously of 6 months to a year and a half or more, nevertheless, in many cases it has been found that after periods of storage, the compositions will be considerably slower curing than is experienced with the compositions immediately after manufacture and they may not cure at all. It has been postulated that this slowing in the rate of cure is caused by a degradation in the alkoxy cross-linking groups in the polymer system caused by free or unbonded hydroxyl groups in the composition. It has also been demonstrated that this deficiency can be corrected by the utilization of a scavenger for hydroxy groups. The scavenger has a functional group or groups which react with the hydroxy groups and bond with them so that they cannot further degrade the alkoxy-functional groups in the polymer system. Accordingly, it has been found out that these compositions as disclosed in White, et al, U.S. Pat. No. 4,395,526 are extremely more efficient, faster curing and more shelf stable than the compositions of Beers, U.S. Pat. No. 4,100,129.

There have been further developments in the art in this area. For instance, see the disclosure of Chung, Ser. No. 338,518 filed Jan. 11, 1982, now U.S. Pat. No. 4,424,157, which discloses the utilization of a cyclic amide as a scavenger. Further, there are the disclosures of Lucas, Ser. No. 349,538, filed Feb. 11, 1982, now U.S. Pat. No. 4,483,973, which discloses the use of various adhesion promoters in such systems and Ser. No. 349,537, filed Feb. 17, 1982, now abandoned, which discloses the utilization of various plasticizing additives and various types of fillers in such compositions to make them low-modulus. Further, there is the disclosure of Dziark, Ser. No. 349,695, filed Feb. 17, 1982, now U.S. Pat. No. 4,417,042, which disclosed the utilization of silazane scavengers in such systems. With respect to the silazane scavengers in such systems as disclosed in U.S. Pat. No. 4,417,049 these compounds are purely scavengers and cannot be utilized as integrated cross-linkers. Further, there is the subsequent Patent Application of Beers, et al, of Ser. No. 428,038 filed Sept. 29, 1982, which discloses the use of alkoxy-functional silazanes which can be utilized either just as scavengers or depending on their functionality, as integrated cross-linkers. Then, there is the Patent Application of Lucas, Ser. No. 437,895, filed Nov. 1, 1982, now abandoned, which discloses the production of such systems continuously by the utilization of a static mixer and a devolitizing extruder.

However, a more pertinent Patent Application as far as the instant case is concerned is the Patent Application of Chung, Ser. No. 427,930, filed Sept. 29, 1982, now abandoned. This Patent Application discloses the end-capping of and particularly the efficient and rapid end-capping of a silanol diorganopolysiloxane polymer with a polyalkoxy functional cross-linking agent in the presence of certain catalysts. Although the earlier cases of White, et al, U.S. Pat. No. 4,395,526, disclose as catalysts for such end-capping reactions amine functional compounds, it was the contribution of Chung, Ser. No. 427,930 filed Sept. 29, 1982 now abandoned, to utilize certain types of acids as end-capping catalysts in the reaction of polyalkoxy-functional silane cross-linking agents with silanol terminated diorganopolysiloxane polymers. Such end-capping catalysts were effective irrespective of whether they were utilized with an integrated cross-linker, scavenger or just a cross-linking agent in the reaction. It was also further disclosed in that Patent Application that the most efficient end-capping catalyst is a combination of an acid with an amine-functional compound. Thus, in these reactions the polyalkoxy silane is reacted with a silanol terminated diorganopolysiloxane in the presence of such catalysts which results in a rapid and efficient end-capping reaction. It should be pointed out that such an end-capping reaction is considerably more efficient and results in more of the desired product than is the case with the end-capping reaction of Brown, et al, U.S. Pat. No. 29,760. This patent discloses the reaction of alkoxy-functional chlorosilanes with silanol terminated diorganopolysiloxane polymers to produce the desired polyalkoxy terminated diorganopolysiloxane polymer which forms the base of an alkoxy-functional one-component RTV system. Not only is the end-capping reaction more efficient as disclosed in the foregoing Patent Application of Chung, Ser. No. 427,930, now abandoned but further, the final product has more advantageous properties; that is, it is more stable and has a faster cure rate and has generally better physical properties than is the case with the Brown, et al, cured composition which is produced as disclosed in U.S. Pat. No. 29,760. It is now generally desirable to disclose another way of producing such polyalkoxy-functional diorganopolysiloxane polymers for utilization as base polymers in the production of one-component RTV systems.

Accordingly, it is one object of the present invention to provide an efficient process for producing a polyalkoxy-functional terminated diorganopolysiloxane polymer which can be utilized to produce one-component RTV systems.

It is an additional object of the present invention to provide a simple but rapid process for the production of alkoxy-terminated diorganopolysiloxane polymers.

It is a still further object of the present invention to provide for alkoxy-functional one-component RTV systems by disclosing a simple but efficient process for production of the alkoxy-functional base polymer utilized in such systems.

These and other objects of the present invention are supported by the disclosures set forth herein below.

SUMMARY OF THE INVENTION

In accordance with the above objects, there is provided a process for producing alkoxy-terminated polysiloxane polymers which can be used to produce RTV silicone rubber compositions, comprising, anhydrously reacting (1) a silanol or vinyl containing siloxane selected from silanol-terminated diorganopolysiloxane polymers, having a viscosity in the range of 100 to 1,000,000 centipoise at 25° C. and vinyl-terminated diorganopolysiloxane polymers, having a viscosity in the range of 100 to 1,000,000 centipoise at 25° C. where the organo groups in both such polymers are selected from $C_{(1-13)}$ monovalent hydrocarbon radicals with (2) a polyalkoxy cross-linking agent having the formula,

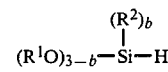

where $R^1$ is a $C_{(1-8)}$ monovalent hydrocarbon radical and $R^2$ is a $C_{(1-13)}$ monovalent hydrocarbon radical and b is 0, 1 or 2 in the presence of (3) a platinum catalyst.

It should be noted that in the production of such RTV compositions it is desirable to first form the alkoxy-terminated diorganopolysiloxane polymer in the composition and then add the additional ingredients including the scavengers. Thus, it is disclosed in Chung, Ser. No. 427,930, now abandoned, that it is desirable to first react the silanol terminated polymer with the integrated cross-linker scavenger or if just a cross-linker is used, with the cross-linker, in the presence of the end-capping catalyst to form the alkoxy-terminated diorganopolysiloxane polymer. Then the scavenger and other ingredients are added to the composition. If this is done a cured RTV elastomer is produced with better physical properties. Further, the uncured composition is faster curing and is more shelf stable. Before proceeding to the details of the instant invention, it is important to note here that all the Patent Applications and Patents in the instant case are incorporated by reference.

DESCRIPTION OF THE PREFERRED EMBODIMENT

The basic process of the instant case comprises reacting a silanol-terminated diorganopolysiloxane polymer having a viscosity in the range of 100 to 1,000,000 centipoise at 25° C. and more preferably having a viscosity in the range of 5,000 to 200,000 centipoise at 25° C. with a hydrogen-containing polyalkoxysilane in the presence of a platinum catalyst. In this reaction hydrogen is given off and is continually stripped off during the process, so as to bond the silane to the polysiloxane on the terminal oxygen atom. In the alternative, the desired polyalkoxy diorganopolysiloxane polymer can be produced by reacting a vinyl-terminated diorganopolysiloxane polymer having a viscosity in the range of 100 to 1,000,000 centipoise at 25° C. and more preferably having a viscosity in the range of 5,000 to 200,000 centipoise at 25° C. with the same hydrogen containing polyalkoxy silane in the presence of a platinum catalyst. The addition of a hydride to a vinyl group in a polysiloxane is known in silicone chemistry. In addition, the reaction of a hydrogen containing silane with a silanol-containing polysiloxane, to bond the silane to the polysiloxane through an oxygen atom and to give off hydrogen gas as a byproduct in the presence of a platinum catalyst is also known in silicone chemistry. The silanol containing polysiloxane can be any silanol-terminated diorganopolysiloxane polymer, and preferably one that has the formula,

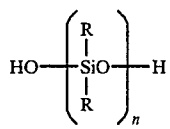

where each R in the formula is independently selected from $C_{(1-13)}$ monovalent hydrocarbon radicals and n is an integer having a value of from about 50 to 2,500 and more preferably having a value from 500 to 2,000.

Radicals represented by the R radical can be for instance, aryl radicals and halogenated aryl radicals such as phenol, methylphenol, chlorophenol, naphthyl, alkyl radicals such as methyl ethyl, etc.; aliphatic and cycloaliphatic radicals, for example, methyl, ethyl, propyl, cyclohexyl, cyclobutyl, etc., alkenyl radicals such as vinyl, allyl, etc.; and cyanoalkyl radicals for example, cyanoethyl, cyanopropyl, cyanobutyl. Most preferably the R radicals are selected from alkyl, and phenyl and halogenated alkyl radicals. Further, although there can be some silanol groups in the polymer chain, it is preferred that the only silanol groups be in the terminal silicon atoms of the polysiloxane of Formula (2). Some silanol groups can be tolerated in the polymer chain of the polymer Formula (2) such that the compound can be a mixture of polymer species of the compounds of Formula (2) along with compounds in which there are some silanol groups in the polymer chain in which such polymer species may or may not have terminal silanol groups, but preferably do have such silanol groups. Such compounds can be tolerated in only limited amounts since if there are silanol groups in the polymer chain as well as on the terminal silicone atoms, the compound will over cross-link when it cures and will not result in desirable physical properties. Accordingly, most of the polymer species in the base silanol containing polymer compound should have the structure of Formula (2).

The other ingredient in the composition can generally comprise the polyalkoxy silane of Formula (1). In that formula, the $R^1$ radicals can be selected, for example, from $C_{(1-8)}$ alkyl radicals, for example, methyl, ethyl, propyl, butyl, etc.; $C_{(7-13)}$ aralkyl radicals, for example, benzyl, phenylethyl and aryl radicals such as phenyl and so forth, alkylether radicals such as 2, methoxy ethyl; alkylester radicals for example, 2, acetoxy ethyl; alkyl ketone radicals for example, 1 butan-3-onyl; alkyl cyano radicals, for example, 2 cyano ethyl. Preferably the $R^1$ radical is a $C_{(1-8)}$ alkyl radical or $C_{(7-13)}$ aryl radical such as methyl or phenyl. Broadly speaking, $R^1$ is a $C_{(1-8)}$ aliphatic organic radical selected from alkyl radicals, alkylether radicals, alkyl ester radicals, alkyl ketone radicals and alkyl cyano or a $C_{(7-13)}$ aryl radical selected from one of the radicals indicated above. Further, generally $R^2$ in the compound of Formula (2) is generally a $C_{(1-13)}$ monovalent organic radical selected from the same radicals as given for the R radical previously. Most preferably, $R^2$ can be selected from alkyl radicals of 1 to 8 carbon atoms such as methyl, alkenyl radicals of 2 to 8 carbon atoms such as vinyl and aryl radicals such as phenyl.

The compounds of Formula (1) and (2) are reacted in the presence of a platinum catalyst as platinum metal catalyst. Preferably there is present from 1 to 500 parts per million of platinum in the composition and more preferably, from 1 to 200 parts per million of platinum as catalyst platinum metal in the reaction composition. The catalyst can be a solid platinum catalyst deposited on gamma-alumina or charcoal or it can be a solubilized platinum complex. The solubilized platinum complex are preferred since they are the more reactive catalysts. The solubilized platinum complexes can be selected from those having the formula, $(PtCl_2 \cdot Olefin)_2$ and H $(PtCl_3 \cdot Olefin)$ as described in U.S. Pat. No. 3,159,601, Ashby. The olefin shown in the previous two formulas can be almost any type of olefin, but is preferably an alkenylene having from 2 to 8 carbon atoms, a cyclo alkenylene having from 5 to 7 carbon atoms or styrene. Specific olefins utilized in the above formulas are ethylene, propylene, the various isomers of butylene octylene, cyclopentene, cyclohexene, cycloheptene, etc. A further platinum containing material usable in the composition of the present invention is a platinum chloride cyclopropane complex $(PtCl_2 \cdot C_3H_6)_2$ described in U.S. Pat. No. 3,159,662, Ashby.

Still further, the platinum containing material can be a complex formed from chloroplatinic acid with up to two moles per gram of platinum of a member selected from the group consisting of alcohols, ethers, aldehydes and mixtures of the above as described in U.S. Pat. No. 3,220,972, Lamoreaux.

The preferred platinum compound to be used as a platinum catalyst, is that disclosed in U.S. Pat. No. 3,775,452 Karstedt. Generally speaking, this type of platinum complex is formed by reacting chloroplatinic acid containing 4 moles of water of hydration with tetravinylcyclotetrasiloxanes in the presence of sodium bicarbonate in an ethanol solution. It should be noted that the Karstedt platinum catalyst is a solubilized platinum complex of platinum with a linear or cyclic low molecular weight vinyl terminated polysiloxane polymer. On the other hand, another preferred catalyst that may be utilized is that disclosed in Modic, U.S. Pat. No. 3,516,946 which comprise a complex formed between platinum and a vinyl-containing cyclopolysiloxane such as methyl, vinyl cyclotetrasiloxane. The most preferred catalysts are the Karstedt, Modic and Lamoreaux catalysts as disclosed in the foregoing patents which are incorporated by reference. Another preferred catalyst is that disclosed in Willing, U.S. Pat. No. 3,419,513. Generally, the most reactive type of platinum complex catalysts are those disclosed in the Karstedt, Lamoreaux, Willing and Modic patents.

A catalyst that is preferred and has been utilized in the examples is the solubilized platinum complex produced by complexing platinum with tetravinyldimethyldisiloxane which is the Karstedt catalyst. The reaction is carried out by mixing the silanol containing polymer with the hydride and the solubilized platinum complex as disclosed above.

Although the reactants can be reacted in stoichiometric quantities, this is generally not preferred since it is very difficult to control the amount of hydride silane needed in the reaction. Accordingly, to drive the reaction to completion, it is generally desired to have at least 100% excess of the hydride polyalkoxysilane and more preferably 1,000% or more of the hydride silane in excess. This is desired in the reaction with the silanol containing polymer of Formula (1) since if the hydride is present in such quantities it is certain to drive the reaction to completion. Further, excess hydride is desired since it will react with all the free hydroxy groups in the composition as was pointed out above. The reaction is carried out anywhere from 30 minutes to 2 hours and is more preferably carried out from 30 minutes to 1 hour. Excess time is not needed to carry out the reaction to completion since by increasing the temperature within the ranges indicated below the reaction can be driven as fast as is desired with the proper type of platinum catalyst. Accordingly, the preferable temperature of reaction is anywhere from 50° to 150° C. and more preferably, 50° to 100° C. Although the reaction can be carried out at room temperature, it is somewhat slow at that temperature. Accordingly, by increasing the temperature above room temperature, the reaction can be speeded as desired. The above reaction is extremely active at temperatures around 100° C. and proceeds very quickly. Preferably the reaction is carried out at atmospheric pressure. Since hydrogen gas is given off during the process, it can be carried out in a vacuum system to facilitate the stripping of hydrogen gas.

It is necessary, however, to carry out the reaction anhydrously. That is, that water be admitted to the system and that reaction products be kept as much as possible free from moisture during and after the reaction since moisture or free hydroxy groups is deleterious to the stability of the final RTV composition which is produced by using the base alkoxy-terminated diorganopolysiloxane polymer. Before proceeding to a discussion of that, it is necessary to say something about a solvent. Solvents are desirably utilized to make the reaction go faster; for example, any inert organic solvent may be utilized. Examples of such solvents are for instance, aromatic solvents such as benzene, xylene, toluene; chloroaliphatic solvents such as chloroethylene; hydrocarbon solvents such as hexane, octane, etc.; and cycloaliphatic hydrocarbon solvents. Any of the common organic solvents which are inert to the reaction may be utilized in the instant process. After the reaction is over and the alkoxy terminated diorganopolysiloxane polymer is formed, the solvent is stripped since it is not desired in the final product. Further, preferably in this reaction with the silanol containing polysiloxane there is continutally stripped the hydrogen gas that is formed by carrying out the process at atmospheric pressure as stated above or under vacuum.

The process may be carried out under much the same conditions by reacting the vinyl terminated diorganopolysiloxane polymer of a viscosity in the range of 100 to 1,000,000 centipoise and preferably 5,000 to 200,000 centipoise at 25° C. with the hydrogen containing polyalkoxy functional silane of Formula (2). Preferably, the vinyl terminated diorganopolysiloxane polymer has the formula,

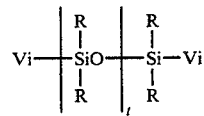

where Vi is vinyl, each R is independently selected from $C_{(1-13)}$ monovalent hydrocarbon radicals and defined as above; t is a whole number that varies from 50 to about 2,500 and more preferably varies from 500 to 2,000.

Again as indicated with respect to the silanol polymer of Formula (2) the vinyl terminated diorganopolysiloxane can have some vinyl groups in the polymer chain; that is the polymer can be a blend of polymer species in which some of the polymer species have vinyl groups in the polymer chain. There also can be polymer species in which there are vinyl groups in the polymer chain and one or no vinyl groups on the terminal positions in the polymer chain. However, such polymer species must be present in small amounts, since they would retard the cure of the composition and would take away from its desired cured physical properties. With respect to the polymer species having vinyl groups in the terminal silicon atoms and vinyl groups in the polymer chain, such polymer species can be tolerated but are undesirable in large amounts since they would tend to cause the final alkoxy-containing base polymer to over cross-link and result in a diminution of its cured physical properties. Accordingly, most of the polymer species are preferred to be comprised of the structure of Formula (3). Further, there can be used a mixture of polymers of Formula (2) and (3).

Further, the vinyl-containing diorganopolysiloxane can be a blend of various vinyl polymers preferably within the scope of Formula (3) and it is only desirable that the blended viscosity of the composition be within the ranges indicated above. This is also true of the silanol containing polysiloxane of Formula (2) which can be a blend of polymers of various viscosities so long as the final blended composition has the viscosity within the ranges indicated previously. The vinyl-containing polysiloxane of Formula (3) reacts with the hydrogen containing silane of Formula (1) so as to add the hydrogen and silicon onto the vinyl group in the presence, at the same concentration and with the same type of platinum complex catalyst as disclosed above for the previous reaction. The reaction conditions are much the same as in the previous reaction so nothing more need be said about that here. The main difference in the reaction is that no hydrogen gas is given off during the process. Further, the hydrogen containing siloxane is preferably used in excess and preferably within the ranges indicated above for the previous process that is from 100% to 1,000% in excess so that the hydrogen can react with all excess hydroxy groups in the polymer mixture or in the ingredients added to the polymer mixture as will be explained below whereupon all hydroxy groups which are undesired in the composition are removed. Again, preferably the reaction must be carried out anhydrously and the final product kept away or removed or maintained in a substantially anhydrous state, as free as possible from moisture since moisture or hydroxy groups would deleteriously affect the composition in the production of one-component RTV silicone rubber compositions.

It should be pointed out that the polymer species that is desired, is an alkoxy containing polymeric species that can have 1, 2 or 3 terminal alkoxy groups or hydrocarbonoxy groups in either one or both terminal ends of the diorganopolysiloxane polymer chain.

To cross-link properly, the compound should have two or more alkoxy groups on both terminal silicon atoms in the polysiloxane that is formed by the above process. However, in the polymer blend, there can be tolerated some polymer species in which on either one or both of the terminal silicon atoms in the polysiloxane there is one alkoxy group. However, such polymer species should not be present in great quantities since the composition will not cure properly and will not have the proper cured physical properties.

Further, with respect to the second process outlined above between the vinyl containing polysiloxane and the hydrogen-containing polyalkoxy silane, it is preferred that the process be carried out under atmospheric pressure or under vacuum so as to facilitate the stripping of hydrogen gas. Although hydrogen gas will not be formed in the addition process of the hydride to the vinyl group of the polysiloxane, hydrogen gas will be formed in the reaction of the hydride with the hydroxy groups that are present in any of the other ingredients that may be added to the composition.

It must also be appreciated that after the reaction is over in this second process as well as the first, it is desirable and necessary that the excess hydride be stripped since such polyalkoxysilanes will tend to give off hydrogen gas in the composition during storage. A small amount of excess hydrogen containing silane of Formula (1) can be tolerated in the composition during storage, but large amounts should not be present in the base alkoxy-terminated polysiloxane after an RTV composition has been formed from it.

The manner in which the alkoxy-terminated polymer is utilized to produce one-component RTV compositions can be varied as desired. For instance, in the initial part of the process there can be added all the silanol containing ingredients which will be defined below. Then during the reaction as outlined above, the hydroxy groups of such ingredients such as fumed silica and calcium carbonate will be bonded and reacted with, so they will not affect the alkoxy-terminated polysiloxane upon storage. In an alternative procedure, the ingredients can be reacted with various agents prior to incorporation into the composition so they contain very little or no hydroxy groups. These treated compounds or ingredients are then preferably added to the alkoxy-terminated polysiloxane after the above reaction in a well-known anhydrous manner.

In a third alternative procedure of producing the RTV composition, the treated ingredients which contain little or no silanol groups in them along with ingredients which normally do not contain silanol groups can be added to the composition along with the scavenger, which scavenger can be any of the well-known scavengers as will be defined below. The scavenger can either be a pure scavenger or an integrated cross-linker, scavenger to tie up or bond with hydroxy groups in any of the ingredients or any of the hydroxy groups that may be remaining in the alkoxy-terminated polysiloxane that is produced by the above processes. In a fourth alternative procedure, the alkoxy-terminated polysiloxane can be formed by either of the above processes and then in an anhydrous manner, there can be added the normal or desirable ingredients that are added to one-component RTV compositions as will be defined below, to impart to the cured elastomer various properties. These ingredients can be semi-treated or untreated such that they contain small amounts of hydroxy groups in them. There can be added sufficient amounts of a scavenger prior to the addition of the ingredients to the alkoxy-terminated polysiloxane so that the scavenger will tie up the hydroxy groups in such ingredients.

Irrespective of which method is applied, it is desirable to maintain the alkoxy-terminated polysiloxane once it is formed, in substantially an anhydrous manner and to add the ingredients in a substantially anhydrous manner. Once the composition is formed with the ingredients mixed therein, it should be stored in a substantially anhydrous manner prior to use.

For the purposes of this application, a scavenger either a pure scavenger or scavenging leaving group in an integrated cross-linker, scavenger compound is defined as a functional group which will react with and tie up hydroxy groups such that they cannot attack or degrade alkoxy groups in the base alkoxy terminated diorganopolysiloxane compositions. The hydride containing silane that is the excess amounts of the hydrogen containing silane of Formula (1) also acts as a scavenger in the initial reaction.

Examples of scavengers that may be utilized with the instant base alkoxypolysiloxane to scavenge hydroxy groups is, for instance, a scavenger for hydroxy-functional group which is silicon-nitrogen compound selected from the class consisting of (A) a silicon-nitrogen compound having the formula

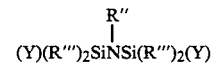

where y is selected from R''' and R''$_2$N —and (B) a silicon-nitrogen polymer comprising (1) from 3 to 100 mole percent chemically combined structural units selected from the class consisting of units having the formula

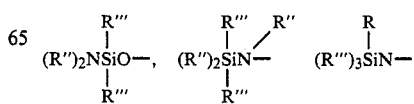

-continued

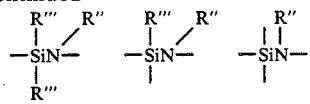

and (2) from 0 to 97 mole percent chemically combined structural units represented by the formula

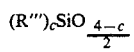

and mixtures thereof where the silicon atoms of said silicon-nitrogen polymer are joined to each other by a member selected from an SiOSi linkage and a SiNR"Si linkage, the free valences of said silicon atoms other than those joined to oxygen to form a siloxy unit and nitrogen to form a silazy unit are joined to a member selected from an R''' radical and (R")$_2$N radical, and where the ratio of the sum of said R''' radicals and said (R")$_2$N radicals to the silicon atoms of said silicon-nitrogen polymer has a value of 1.5 to 3, inclusive, and R" is a member selected from the class consisting of hydrogen and monovalent hydrocarbon radicals, and fluoroalkyl radicals, R''' is a member selected from hydrogen, monovalent hydrocarbon radicals and fluroalkyl radicals, and c is a whole number equal to 0 to 3.

Preferably there is utilized from 0.5 to 10 parts by weight of the scavenger per 100 parts by weight of the alkoxy containing polysiloxane. The above silazane functional scavenger is a pure scavenger and cannot function as an integrated cross-linker, scavenger. For more details as to such scavengers and their use in alkoxy-functional one-component RTV composition one is referred to the patent of John Dziark, Ser. No. 349,695 filed Feb. 19, 1982, now. U.S. Pat. No. 4,417,042.

Another scavenger that can be utilized in the instant composition which can be either an integrated cross-linker, scavenger compound or a pure scavenger is a scavenger for hydroxy functional groups selected from the class consisting of non-cyclic silyl nitrogen scavenger of the formula,

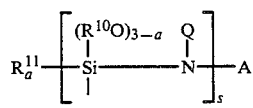

and cyclic silyl nitrogen scavengers having at least one or all of the units of the formula,

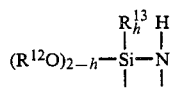

and the rest of the units, if any, having the formula, $$(R^{14})_2-\underset{|}{\overset{H}{\underset{|}{Si}}}-\underset{|}{N}$$

where $R^{10}$ is $C_{(1-8)}$ aliphatic organic radical selected from the group consisting of alkyl, alkylether, alkylester, alkylketone, alkylcyano, and aryl, $R^{11}$ is a $C_{(1-8)}$ monovalent substituted or unsubstituted hydrocarbon radical, Q is selected from hydrogen, $C_{(1-8)}$ monovalent substituted or unsubstituted hydrocarbon radicals and radicals of the formula,

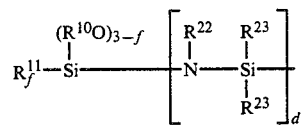

where $R^{10}$, $R^{11}$ are as previously defined, where a varies from 0 to 2, f varies from 0 to 3, h is 0 or 1, where s is a whole number that varies from 1 to 25, d is a whole number that varies from 1 to 25, $R^{22}$ is selected from hydrogen and $C_{(1-8)}$ monovalent hydrocarbon radicals and $R^{23}$ is independently selected from $C_{(1-8)}$ hydrocarbon and hydrocarbonoxy radicals, A is selected from the class consisting of hydrogen and $C_{(1-8)}$ monovalent substituted or unsubstituted hydrocarbon radicals and radicals of the formula,

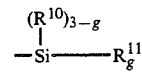

where $R^{10}$, $R^{11}$ are as previously defined, g varies from 0 to 3 and in the above scavengers there is at least one hydrocarbonoxy group in the molecule, $R^{12}$ is defined the same as $R^{10}$, and $R^{13}$ is defined the same as $R^{11}$, and $R^{14}$ is defined the same as $R^{11}$. For more information as to such scavengers, one is referred to the Patent Application of Chung, et al, Ser. No. 428,038. Such scavenging compounds of the above formula having two or more alkoxy groups can function as integrated cross-linker, scavengers. However, such integrated cross-linker, scavengers when they are such, must be added only after the initial reaction or process is over, for reasons which will be explained below.

Other types of silane scavenger compounds which may be used with the instant alkoxy-terminated diorganopolysiloxane polymer to form RTV compositions are one of the formula,

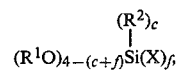

where $R^1$ is a $C_{(1-8)}$ aliphatic organic radical selected from the group consisting of alkyl, alkylether, alkylester, alkylketone, and alkylcyano radicals, or a $C_{(7-13)}$ aralkyl radical, $R^2$ is a $C_{(1-13)}$ monovalent substituted or unsubstituted hydrocarbon radical, X is a hydrolyzable leaving group selected from the group consisting of silazy, cyclic amido, amido, amino, carbamato, enoxy, imidato, isocyanato, oximato, thioisocyanato and ureido radicals and, c is a whole number equal to 0 to 3 inclusive, f is an integer equal to 1 to 4 inclusive and the sum of c+f is equal to 1 to 4 inclusive.

There may also be in the composition an effective amount of a curing accelerator selected from the group consisting of substituted guanidines, amines and mixtures thereof.

More preferred silane scavengers within the scope of the above formula are ones of the formula,

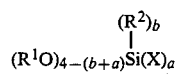

where $R^1$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^2$ is a $C_{(1-13)}$ monovalent substituted or unsubstituted hydrocarbon radical, X is a hydrolyzable leaving group selected from the group consisting of silazy, cycloamido, amido, amino, carbamato, enoxy, imidato, isocyanato, oximato, thioisocyanato and ureido radicals; and a is an integer equal to 1 to 2 inclusive, b is a whole number equal to 0 to 1 inclusive, and the sum of b+a is equal to 1 to 2 inclusive and the silane is both the silane scavenger for hydroxy-functional groups and a polyalkoxysilane cross-linking agent for terminating the silicon atom at each organopolysiloxane chain end with at least two alkoxy radicals. For more information as to such scavengers, one is referred to the disclosure of White, et al, U.S. Pat. No. 4,395,526 and the disclosure of Chung, Ser. No. 338,518, filed Jan. 11, 1982, now U.S. Pat. No. 4,424,157 which is incorporated by reference.

If the compound is a cross-linker and scavenger as defined in the above patent applications, it cannot be utilized in the instant composition until after the initial reaction of the formation of the alkoxy-terminated organopolysiloxane polymer. The reason for this is that the hydrogen atom in the hydride silane will most probably react with the functional group in the scavenger or integrated cross-linker scavenging compound in the presence of a platinum catalyst, especially at elevated temperatures. There is also the possibility that such functional groups may even poison the platinum catalyst so that the reaction does not take place. Accordingly, for these reasons it is preferred that the scavenging compound if it is such or integrated cross-linker, scavenger compound be added, after the initial reaction has proceeded to completion and the alkoxy terminated diorganopolysiloxane base polymer is formed. Again the scavenging compound may be added to the composition at concentration of 0.5 to 10 parts by weight of the scavenger or integrated cross-linker, scavenger per 100 parts by weight of the organopolysiloxane or more generally in accordance with the description in the patent of White, et al, U.S. Pat. No. 4,395,526.

Preferably, such scavenging compounds or integrated cross-linker, scavenger compounds are added to the composition after the alkoxy-terminated diorganopolysiloxane polymer is formed, but before any silanol containing ingredients are added to the base polymer to form a one-component RTV composition. Other ingredients that may be added to the composition in any of the ways that has been explained above; which ingredients can be used in such one-component RTV compositions as have been disclosed in the patent applications referred to previously, or which are disclosed as suitable for one-component RTV compositions by the prior art. Such ingredients can be, for instance, the adhesion promoters of Lucas, et al, Ser. No. 349,538 filed Feb. 17, 1982 or the adhesion promoter and the other additives of Beers, Ser. No. 349,537 filed Feb. 17, 1982, which is hereby incorporated by reference. Thus, there may be a cure accelerator as selected from the group consisting of substituted guanidines, amines and mixtures thereof as defined in White, et al; or there can be added per 100 parts of diorganopolysiloxane from 2 to 20 parts by weight of a first plasticizer or fluid polysiloxane containing a high degree of tri-functionality or mixtures of tri- and tetra-functionality and comprising, (i) from 5 to 60 mole percent monoalkyl-siloxy, siloxy units or a mixture of such units;

(ii) from 1 to 6 mole percent of trialkylsiloxy units and, (iii) from 34 to 94 mole percent of dialkylsiloxy units, said polysiloxane containing from about 0.1 to 2 percent by weight of silicon-bonded hydroxyl groups.

Further, the composition can contain from 5 to 60 parts by weight of a second plasticizer per 100 parts of said base alkoxy-terminated diorganopolysiloxane, the second plasticizer fluid being a linear triorganosiloxy end-stopped diorganopolysiloxane of a viscosity range of from 10 to 20,000 centipoise at 25° C. where the organic group is a monovalent hydrocarbon radical. Generally such fluids can contain from 500 to 1,500 parts per million of silanol. The trifunctional fluid also contains as stated above a certain amount of silanol.

There can be in the composition from 1 to 700 parts by weight of a filler which may be an extending filler such as calcium carbonate or any of the extending fillers well-known in the art. The extending filler is preferably calcium carbonate, treated with stearic acid.

Further, there can be in the composition per 100 parts of the diorganopolysiloxane from 1 to 700 parts by weight of a filler and more preferably from 1 to 50 parts by weight of a reinforcing filler. The reinforcing filler can be selected from fumed silica and precipitated silica. Preferably, when the filler is fumed silica it is treated with cyclopolysiloxanes and/or silazanes. When the filler is added to the composition after the initial reaction in the formation of the alkoxy polysiloxane, it is treated with both cyclopolysiloxanes as well as silazanes so as to tie up the hydroxy groups in the fumed silica. In addition, in the composition per 100 parts of the organopolysiloxane there can be from 0.1 to 2.0 parts by weight of a sag control agent which is a polyether selected from the formulas consisting of:

and $$[A-O-(C_xH_{2x}O)_n-]_y-Q_z$$

where A and B represent radicals selected from the class consisting of hydrogen, alkyl radicals containing from 1 to 12 carbon atoms, cycloalkyl radicals containing 5 to 7 carbon atoms in the ring, mononuclear and binuclear aryl radicals, and mononuclear aryl lower alkyl radicals wherein the alkyl groups attached to the aromatic nucleus contain a total of no more than 5 carbon atoms, $$\underset{\|}{\overset{O}{R-C-O-}}$$

where R is alkyl containing from 1 to 11 carbon atoms; Q is a residue of polyhydric initiator radical containing at least two hydroxyl radicals selected from the class consisting of ethylene glycol, glycerol, trimethylolpropane, and other polyhydric alcohols having from 2 to 6 hydroxyl groups; n is a number having a value of 2 to 4; y has a value of from 2 to 10; and z has a value of from 1 to 5; the polyether having a molecular weight of from about 300 to about 200,000.

In addition to the above sag control agent, there can be present from 0.2 to 2.0 parts by weight of a sag control agent which is hydrogenated castor oil. Then there can be present adhesion promoters which can be any of the adhesion promoters disclosed in the foregoing patent applications and which adhesion promoters can be present in concentrations of anywhere from 0.1 parts by weight or more so that they are used at their maximum efficiency for adhering the composition to a substrate without deliteriously affecting the cure properties of the composition. Since these adhesion promoters are not the subject of the instant invention, they will not be gone into detail except to refer to them generally. Additional ingredients may be added as is desired or needed in the composition as is well-known in the art. As far as the above ingredients are concerned, if a worker skilled in the art needs more information in the use of such, in the compositions of the instant case, one can refer to the disclosure of Beers, Ser. No. 349,537 now abandoned, which is incorporated by reference here. The foregoing plasticizers and trifunctional fluids disclosed above and disclosed in Ser. No. 349,537, now abandoned, will make the composition low-modulus as well as give it desirable physical properties.

Examples of extending fillers that may be utilized in the composition, are, for example, titanium dioxide, zirconium silicate, silica aerogel, zinc oxide, diatomaceous earth, carbon black, glass fibers, polyvinylchloride, ground, quartz, aluminum oxide, iron oxide and so forth. Further, the extending fillers can vary. Desirably the reinforcing fillers are treated with cyclopolysiloxanes or silazanes such as disclosed in Lucas, U.S. Pat. No. 2,938,009, Lichtenwalner, U.S. Pat. No. 3,004,859 and Smith, U.S. Pat. No. 3,635,743.

These additional ingredients that may be added to the composition will not be gone into detail since they are well-known in the art. The patent applications referred to previously disclosed their incorporation in compositions similar to that of the instant case. However, one ingredient that is necessary in the instant composition and which will be gone into detail here, is the condensation catalyst. There must be present in the instant composition a condensation catalyst and preferably a tin condensation catalyst, otherwise the composition will not cure properly and will not have final cured properties similar to a silicone elastomer.

Effective amounts of the condensation catalysts which can be used in the practice of the present invention to facilitate the cure of the RTV compositions are, for example, 0.001 to 1 part based on the weight of 100 parts of the alkoxy-terminated polydiorganosiloxane. There are included tin compounds, for example, dibutyltindilaurate; dibutyltindiacetate; dibutyltindimethoxide; carbonmethoxyphenyl tin tris-uberate, tin octoate; isobutyl tin triceroate; dimethyl tin dibutyrate; dimethyl tin di-neodeconoate; triethyl tin tartrate; dibutyl tin dibenxoate; tin oleate; tin naphthenate; butyltintri-2-ethylhexoate, tinbutyrate. The preferred condensation catalysts are tin compounds, and dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyltitanium compounds as shown by Weyenberg, U.S. Pat. No. 3,334,067 can be used as condensation catalysts in the present invention.

Zirconium compounds, for example, zirconium octoate also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate.

Examples of non-metal condensation catalysts are hexylammonium acetate and benzyltrimethylammonium acetate.

The only other observation that need be made is what was stated previously, is that the ingredients that are added to the base alkoxy-terminated diorganopolysiloxane must be treated if they have hydroxy groups or there must be added a scavenger to the alkoxy-terminated diorganopolysiloxane prior to the incorporation of such ingredients and such scavenger or integrated cross-linker, scavenger must be in sufficient quantities to tie up the hydroxy groups. In the alternative, such hydroxy containing compounds can be added prior to the reaction between the vinyl or silanol containing polysiloxane and the hydrogen containing silane and the scavenger can be added to the composition as soon as the alkoxy terminated diorganopolysiloxane is formed, but prior to the addition of other silanol containing compounds. In the alternative, the silanol containing compounds or ingredients may be added prior to the basic process of the instant case in which the silanol or vinyl containing polysiloxane is reacted with a hydrogen containing silane and in which reaction the hydroxy groups will be removed from such compounds as disclosed previously. Even in that eventuality, it is desirable that a scavenger or integrated cross-linker, scavenger be added after the reaction is over so as to absorb any hydroxy groups that become introduced into the RTV composition in one way or another. In this manner, a a more shelf-stable one-component RTV composition is produced.

Finally, if an integrated cross-linker scavenger is not added and just a scavenging compound is added to the RTV composition as is outlined above, it is desirable that there be added to the basic composition generally from 0 to 10 parts and more preferably from 0.1 to 1 parts of alkoxy silane cross-linking agent of the formula,

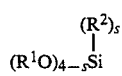

where $R^1$, $R^2$ are as previously defined, and s is a whole number that is 0, 1 or 2. Such a polyalkoxysilane cross-linking agent is added to the composition after the base alkoxy-terminated diorganopolysiloxane polymer is formed or at any time with the addition of the other ingredients so as to keep an excess of alkoxy silane cross-linking agent in the system to help deter any degradation of the alkoxy or hydrocarbonoxy groups in the diorganopolysiloxane polymer and to increase the cross-linked density of the final cured elastomer. This results in a cured composition with higher tensile strength and tear, for instance.

As noted above, if an integrated cross-linker, scavenger is added to the system, then such a compound does not have to be added at this point. With the exception of the above instructions, all such ingredients are added to the composition as is disclosed in the foregoing patent applications and are well-known in the art to produce an alkoxy-functional one-component RTV composition which is stored in a substantially anhydrous state in pails, caulking tubes in whatever manner is suitable for shipping in a particular manufacturing operation. When it is desired to use the composition, the seal on the package is broken and the composition is applied to whatever shape is desired. Upon exposure to elastomeric moisture, the composition will cure into silicone elastomer with final cure taking place in 24 to 72 hours.

The examples below are given for the purpose of illustrating the present invention. They are not for the purpose of setting limits and boundaries to the invention. All parts in the examples are by weight.

EXAMPLE I

In one procedure the method of Brown, et al, U.S. Pat. No. Re. 29,760 was followed utilizing trichlorosilane as a chain terminator. There was mixed 6 parts of tetrachlorosilane, 100 parts of a silanol terminated dimethylpolysiloxane polymer of 5,000 to 15,000 centipoise viscosity at 25° C., 12 parts of α-picolin, 250 parts of toluene. After mixing for 30 minutes, the mixture was heated and excess tetrachlorosilane was removed from the reaction. After the removal of excess tetrachlorosilane, the reaction mixture was cooled to 5° C. and 10 parts of anhydrous methanol was added to react with the trichloro end-stopped polymer. The mixture was allowed to stir for 1½ hours. The solids were then removed and the mixture stripped. There was obtained the desired trimethoxysilyl terminated dimethylpolysiloxane polymer as confirmed by infrared spectroscopy. This will hereinafter be referred to as Polymer A.

In a second procedure, trimethoxy-stopped polydimethyl siloxane was prepared utilizing the platinum catalyzed addition of trimethoxy silane to a silanol end-stopped diorganopolysiloxane polymer of 5,000-15,000 centipoise viscosity at 25° C. This procedure was carried out by mixing 4 parts of the hydride with 100 parts of the silanol polymer, with 0.5 parts of a platinum catalyst which was platinum complexed with divinyl tetramethyldisiloxane and was 5% by weight of platinum. There was present 70 parts of toluene as a solvent. The reaction was carried out for a period of 1 hour at 70° C. After cooling and stripping, there was obtained the desired trimethylsiloxy-stopped polydimethyl siloxane polymer as confirmed by infrared spectroscopy. This shall hereinafter be referred to as Polymer B.

One hundred parts of trimethoxy-stopped silyl-stopped polydimethyl siloxane prepared in the first procedure (Polymer A) was mixed with three parts of methyltrimethoxy silane and 0.13 parts of dibutylditindimethoxide, under substantially anhydrous conditions in a Semkit ® mixing apparatus for 15 minutes. After mixing the catalyzed "Brown, et al" RTV composition was packaged into aluminum tubes.

One hundred parts of Polymer B was then taken in an anhydrous manner and mixed with three parts of methyltrimethoxy silane and 0.13 parts of dibutyltindimethoxide. This substantially anhydrous mixture was packaged in aluminum tubes as described above. The above compositions were aged at room temperature and at 50° and 100° C. in the absence of moisture for varying lengths of time. Subsequent cure speeds were then determined by exposing the aged RTV composition to atmospheric moisture (50% relative humidity at room temperature) and then the tack free times were measured. The results are given in Table I below. The results in Table I reveal the superior stability of the alkoxy curing RTV composition prepared from Polymer B in accordance with the instant invention.

TABLE I

| Methoxy Polymer Type | Age Time (days) | TACK FREE TIME (min.) | | |
|---|---|---|---|---|
| | | Room Temperature | 50° C. | 100° C. |
| Polymer A Brown, et al | 0 | 10 | xx | xx |
| Polymer A Brown, et al | 1 | 10 | gelled | gelled |
| Polymer A Brown, et al | 3 | gelled | | |
| Polymer B | 0 | 30 | xx | xx |
| Polymer B | 1 | 30 | 30 | 30 |
| Polymer B | 6 | 30 | 30 | 30 |
| Polymer B | 22 | 30 | 30 | 30 |

EXAMPLE II

Various unfilled, fast-curing, one-component, alkoxy curing RTV's were prepared using methyldimethoxy end-stopped dimethylpolysiloxane polymers having a viscosity of about 15,000 centipoise at 25° C.; methyltrimethoxy silane as a cross-linker; and a tin compound as a curing catalyst in this example. In one procedure, the method of Brown, et al, U.S. Pat. No. Re. 29,760, was followed utilizing methylchlorodimethoxy silane as a chain terminator. In each reaction there was mixed, 2 parts of the methylchlorodimethoxy silane, 100 parts of a silanol end-stopped dimethylpolysiloxane polymer having the viscosity of 5,000–15,000 centipoise at 25° C., 2 parts of αpicoline and 450 parts of toluene. After mixing for 30 minutes, 2 parts of methanol was added to react with the chlorine bonded silicone. Then, the mixture was then allowed to stir for 30 minutes. The solids were removed and the mixture stripped. There was obtained the desired methyldimethoxy end-stopped polydimethylsiloxane as determined by infrared spectroscopy. This polymer shall hereinafter be referred to as Polymer C. In a second procedure, there was reacted 4 parts of methyldimethoxy silane with 100 parts of a silanol end-stopped dimethylpolysiloxane polymer of 5,000–15,000 centipoise viscosity at 25° C., in the presence of 0.5 parts of the platinum catalyst of Example I and 70 parts of toluene for a period of about 1 hour at 70° C. After cooling and stripping off the silanol, there was obtained the desired methyldimethoxy-stopped dimethylpolysiloxane polymer as determined by infrared spectroscopy having a 5,000–15,000 centipoise viscosity at 25° C. This polymer shall hereinafter be referred to as Polymer D. Both polymers were catalyzed with the same quantities of the same ingredients of methyltrimethoxy silane and dibutyltindimethoxide and aged as described in Example I. Tack free times were then determined after aging with the results as shown in Table II. Examination of the data in Table II provides evidence of the improved shelf-stability of the RTV composition containing the alkoxy polymer produced in accordance with the instant invention as compared to the alkoxy polymer produced by the process of the Brown, et al patent.

TABLE II

| Polymer Type | Age Time (days) | TACK FREE TIME (min.) Room Temperature | 50° C. | 100° C. |
| --- | --- | --- | --- | --- |
| Polymer C | 0 | 30 | xx | xx |
| Polymer C | 1 | 30 | gelled | gelled |
| Polymer C | 3 | gelled | | |
| Polymer D | 0 | 60 | xx | xx |
| Polymer D | 1 | 60 | 60 | 60 |
| Polymer D | 6 | 60 | 60 | 60 |
| Polymer D | 22 | 60 | 60 | 60 |

EXAMPLE III

In this example, various filled fast-curing, one-component alkoxy curing RTV's were prepared using trimethoxy end-stopped dimethylpolysiloxane polymers having a viscosity of about 5,000–15,000 centipoise at 25° C., methyltrimethoxy silane as an excess cross-linker, a tin compound as a curing catalyst and various fumed silica and calcium carbonate.

In one procedure, a trimethoxysilyl terminated dimethylpolysiloxane polymer of about 5,000–15,000 centipoise at 25° C. was produced in accordance with the Brown, et al, patent and as outlined in Example I. To 100 parts by weight of this polymer there was added 3 parts methyltrimethoxysilane 0.13 parts dibutyltindimethoxide and 17 parts of octamethyl tetracyclopolysiloxane treated fumed silica. This composition shall be hereinafter referred to as Composition E. This composition was mixed in a Semkit ® apparatus, aged and measured for cure speed using the procedures described in Example I. The results are given in Table III. There was prepared a trimethoxy end-stopped dimethylpolysiloxane having a viscosity of about 5,000–15,000 centipoise at 25° C. in which the polymer was formed, utilizing the platinum catalization hydrosilation method of Example I. There was mixed to 100 parts of a silanol end-stopped dimethylpolysiloxane polymer having a viscosity range of 5,000–15,000 centipoise at 25° C., 17 parts of hexamethyldisilazane treated fumed silica, 4.0 parts of trimethoxy silane, 0.5 parts of the platinum catalyst of Example I and 150 parts of toluene. The resulting mixture was reacted for a period of 1 hour at 70° C. During reaction, the hydrogen gas that was formed was stripped off. After cooling and stripping off the solvent and excess hydride, there was obtained the desired trimethoxy stopped dimethylpolysiloxane polymer and filler compound, in accordance with the instant invention. This mixture shall hereinafter be referred to as Mixture F.

There was prepared a Mixture G, in accordance with the instant invention comprising reacting 100 parts of a silanol end-stopped dimethylpolysiloxane polymer having a viscosity in the range of 5,000–15,000 centipoise at 25° C., 17 parts by weight of octamethyltetracyclopolysiloxane treated fumed silica, 4.0 parts of trimethoxysilane, 0.5 parts of the platinum catalyst of Example I and 150 parts of toluene. The resulting mixture was reacted for a period of 1 hour at 70° C. After cooling and stripping off the excess hydride and solvent, there resulted the desired trimethoxy-stopped polydimethylpolysiloxane and filler compound which is hereinafter referred to as Mixture G.

In a fourth procedure, a Mixture H was prepared in accordance with the instant invention. There was prepared a mixture of a trimethoxy end-stopped dimethylpolysiloxane polymer having a viscosity of about 20,000 centipoise at 25° C. and a stearic acid treated calcium carbonate filler. This Mixture H was prepared utilizing a platinum catalyzed hydrosilation technique. There was mixed 100 parts by weight of silanol end-stopped dimethylpolysiloxane polymer of a viscosity in the range of 5,000–15,000 centipoise at 25° C., 17 parts by weight of stearic acid treated calcium carbonate, 4.0 parts of trimethoxy silane, 0.5 parts of the platinum catalyst of Example I and 150 parts of toluene. The mixture was again reacted for a period of 1 hour at 70° C. After cooling and stripping there was obtained the desired trimethoxy end-stopped polydimethylsiloxane filler mixture which hereinafter shall be referred to as Mixture H. Mixtures E, F, G and H were all mixed with 2 parts of methyltrimethoxy silane excess cross-linking agent and 0.3 parts of dibutyltindiacetate aged and tested for cure speed as outlined in Example I. The resulting compositions, E, F, G, and H and their test results as shown in the Table III below. Examination of the date in Table III provides evidence of the improved shelf stability of the alkoxy curing polymer compositions prepared in accordance with the instant invention as compared with the ones prepared in accordance with that of the Brown, et al, U.S. Pat. No. Re. 29,760.

TABLE III

| Mixture | Filler | Shelf Age (days) | Tack Free Time |
|---|---|---|---|
| Mixture E | Fumed silica | 1 day at 25° C. | gelled |
| | (treated with tetramer) | 1 day at 25° C. | gelled |
| Mixture F | Fumed silica | 1 day at 25° C. | 100 |
| | (treated with | 1 day at 50° C. | 100 |
| | tetramer and | 1 day at 100° C. | 100 |
| | silazanes) | 6 days at 25° C. | 100 |
| | | 6 days at 50° C. | 65 |
| | | 6 days @ 100° C. | 400 |
| | | 92 days @ 25° C. | 65 |
| | | 92 days @ 50° C. | 65 |
| Mixture G | Fumed silica | 1 day @ 25° C. | 75 |
| | (treated with | 1 day @ 50° C. | 75 |
| | tetramer) | 1 day @ 100° C. | gelled |
| | | 6 days @ 25° C. | 75 |
| | | 6 days @ 50° C. | 75 |
| Mixture H | Stearic Acid | 1 day @ 25° C. | 30 |
| | treated CaCO$_3$ | 1 day @ 50° C. | 30 |
| | | 1 day @ 100° C. | 60 |
| | | 6 days @ 25° C. | 30 |
| | | 6 days @ 50° C. | 30 |
| | | 6 days @ 100° C. | gelled |

EXAMPLE IV

There was mixed in a 4-liter resin kettle fitted with mechanical stirrer, Dean-Stark trap, with take-off valve, water condenser with a nitrogen inlet and thermometer, 100 parts of a vinyl terminated dimethylpolysiloxane polymer having a viscosity of 3,750 centipoise at 25° C. to which was added 1,200 parts of toluene. This mixture was stirred and heated to boiling and the system was dried via azeotropic distillation. A total of 200 parts of toluene was removed during such azeotropic drying. Then there was added 0.5 parts of the same platinum catalyst as Example I which was added in a solution in which there was 5% by weight of platinum. To this mixture there was added 38.5 parts of trimethoxysilane and 50 parts of toluene and the resulting mixture was stirred vigorously at room temperature while the silane was slowly dripped into the vinyl polymer over a one hour period at room temperature. Then the reaction mixture was heated to reflux at a pot temperature of about 115° C. and maintained under a reflux conditions for 2 hours. Then the reaction mixture was cooled to 25° C. and maintained under a nitrogen atmosphere over the weekend.

At the end of this time, the reaction mixture was heated to 80°-90° C. under vacuum so as to strip off the solvent. The resultant liquid, an amber fluid of a viscosity of about 3,750 centipoise at 25° C., was confirmed to be trimethoxy terminated dimethylpolysiloxane polymer. To 10 parts of this polymer there was mixed anhydrously in a Semkit ® mixer for 15 minutes 0.1 parts of tin octoate. Immediately after mixing the composition was exposed to atmospheric moisture and allowed to cure at room temperature. The composition had a tack free time of 2 minutes. Further, it was found that there could be obtained with such composition an ⅛ of an inch deep section cure in less than 24 hours. As the results above indicate, such a polymer would make a good base polymer for a one-component alkoxy-functional RTV composition in accordance with the instant invention.

I claim:

1. A process for producing alkoxy-terminated polysiloxanes which can be used to produce RTV silicone rubber compositions, comprising anhydrously reacting
   (1) a vinyl-terminated diorganopolysiloxane having a viscosity in the range of 100 to 1,000,000 centipoise at 25° C., where the organo groups are $C_{1-13}$ monovalent substituted or unsubstituted hydrocarbon radicals with
   (2) a polyalkoxy crosslinking agent of the formula

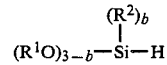

where $R^1$ is a $C_{1-8}$ monovalent hydrocarbon radical, $R^2$ is a $C_{1-13}$ monovalent hydrocarbon radical, and b is 0, 1 or 2; in the presence of
   (3) a platinum or platinum-containing catalyst.

2. The process of claim 1, wherein the vinyl-terminated diorganopolysiloxane has the formula

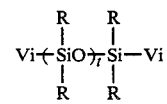

where Vi is vinyl, each R is an independently selected $C_{1-13}$ monovalent hydrocarbon radical, and t is a whole number having a value of from 50 to about 2500.

3. The process of claim 1, wherein the reaction is carried out at atmospheric pressure.

4. The process of claim 1, wherein there is present an excess of at least 100% of polyalkoxy crosslinking agent.

* * * * *